US006272604B1

(12) United States Patent
Nunez et al.

(10) Patent No.: US 6,272,604 B1
(45) Date of Patent: Aug. 7, 2001

(54) CONTINGENT RESPONSE APPARATUS AND METHOD FOR MAINTAINING CACHE COHERENCY

(75) Inventors: Jose Melanio Nunez; Robert Charles Podnar, Jr., both of Austin; Marie Jeannette Sullivan, Leander, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/315,613

(22) Filed: May 20, 1999

(51) Int. Cl.[7] ...................................................... G06F 12/08
(52) U.S. Cl. .......................... 711/146; 711/144; 711/145; 711/156; 711/169
(58) Field of Search .................................... 711/146, 144, 711/156, 145, 169

(56) References Cited

U.S. PATENT DOCUMENTS 5,893,151 * 4/1999 Merchant .............................. 711/140
6,065,098 * 5/2000 Lippert ................................. 711/122
6,138,218 * 10/2000 Arimilli et al. ...................... 711/146

OTHER PUBLICATIONS

Allen, M.S and Lewchuk, W.K., "A Pipelined, Weakly Ordered Bus for Multiprocessing Systems", Compcon '95, Digest of Papers, Mar. 1995, pp. 292–299.*

* cited by examiner

Primary Examiner—Reginald G. Bragdon
(74) Attorney, Agent, or Firm—Anthony V. S. England; Russell D. Culbertson; Shaffer & Culbertson, LLP

(57) ABSTRACT

Each processor (101, 102, 103) in a multiple processor system (100) includes a contingent response unit (121, 122, 123). Each contingent response unit (121, 122, 123) includes a pending operation unit (200) for identifying each pending address bus operation from the respective processor which specifies an address matching a snoop address from another processor. A snoop pipeline is associated with the pending operation unit (200) and includes a plurality of pipeline stages (206). Each snoop pipeline stage (206) has a contingent response flag location (207) and an identifier location (208). When a pending operation from the processor specifies an address which is matched by a younger operation from another processor, a contingent response flag control arrangement uses information from the pending operation unit (200) to set a contingent response flag in a first snoop pipeline stage (206). The contingent response flag control also stores in the first snoop pipeline stage (206) an identifier for the matched pending operation. If the matched pending operation finishes the address bus pipeline unsuccessfully and is itself retried, the contingent response flag control arrangement clears the contingent response flag in the snoop pipeline stage (206) in which the flag then resides. Otherwise the contingent response flag is used to provide a snoop response to the younger operation which matched the pending operation.

30 Claims, 8 Drawing Sheets

CONTINGENT RESPONSE APPARATUS AND METHOD FOR MAINTAINING CACHE COHERENCY

TECHNICAL FIELD OF THE INVENTION

This invention relates to data processing systems which include two or more processor devices sharing an address bus. More particularly, the invention includes an apparatus and method for coordinating the use of cache memory blocks by the different processors.

BACKGROUND OF THE INVENTION

Data processing systems and particularly microprocessor devices may include multiple processors which share system address and data buses. Each processor in such a multiple processor system commonly includes its own cache memory. Although each processor may include separate cache memory, each processor in the system may be allowed to address any particular line in cache memory, even a line of data currently stored at a cache location in another processor. Multiple processor systems which allow the various processors to address any cache location in the system must also include some arrangement for coordinating the use of cache memory to maintain "cache coherency" in the system. As used in this disclosure, "cache coherency" means generally the control of various cache memory locations necessary to facilitate proper system operation.

Processor systems which require high address bus throughput typically "pipeline" address bus operations. In these pipelined address buses, operations from the various processors are processed or held in a series of pipeline stages. Each pipeline stage requires one address bus clock cycle, and a different address operation is processed at each different pipeline stage during each given period. The number of address bus clock cycles it takes for an address operation to be processed through the pipelined address bus may be referred to as the address tenure on the bus.

In multiple processor systems which utilize a shared address bus, only a single address operation from one of the processors may enter the address bus pipeline in any given clock cycle. An address bus arbitration arrangement selects which particular processor may drive an address operation into the first stage of the pipelined address bus in a given clock cycle. Since the address bus is shared, that is, connected to each processor, each processor which is not selected by the address bus arbitration arrangement receives or "sees" the address operation which enters the pipeline address bus from a different processor. These receiving processors are said to "snoop" the operation entering the address bus pipeline from another processor. Both the address specified in an operation entering the address bus pipeline and other information such as an operation type may be snooped by the other processors sharing the address bus. The operation snooped on a shared address bus is commonly referred to as a snoop operation or query. The address and operation type specified in a snoop operation may be referred to as a snoop address and a snoop type, respectively.

Cache coherency in a multiple processor system is maintained by the processor which "owns" the data at a particular address. Ownership is defined according to a suitable protocol under which a system is designed to operate. The protocol determines how a first processor responds to a conflicting operation from another processor. A "conflicting operation" in this sense refers to an operation specifying the same address owned by another processor. According to one protocol, when a first processor "owns" data at a particular address and snoops a conflicting operation from a second processor, the first processor transmits a retry snoop response to the second processor. This retry snoop response lets the second processor know that it may not have the data at the specified location at that time. Multiple processor systems are designed such that each processor placing an address operation on the pipelined address bus in a given clock cycle will receive a snoop response to the action within a given number of address bus clock cycles. The number of clock cycles in which a snoop response will be received is referred to as the "snoop response window."

For some operations, ownership of a particular cache block is declared after the operation completes the snoop response window without receiving a retry snoop response from another processor. However, ownership is not claimed during the address tenure itself. That is, ownership of the specified cache block is not claimed between the address bus clock cycle in which the address operation enters the address pipeline and the clock cycle in which the address operation finishes the pipeline.

Since a first processor does not have ownership of a cache block during the address tenure of certain types of operations that the processor may issue, the first processor does not recognize immediately if it should issue a retry snoop response to a conflicting address operation from another processor. It is only after the first processor passes its own snoop response window without receiving a retry response that the first processor knows with certainty that it has obtained ownership of the cache block and thus that it should transmit a retry snoop response to the processor issuing the younger conflicting address bus operation.

This uncertainty during the address tenure of an operation presents a problem as to the appropriate response to younger conflicting address bus operations which are snooped from the shared address bus. Simply retrying each younger conflicting address bus operation would result in unnecessarily retried operations since the processor prompting the retry response might not actually obtain ownership of the address. On the other hand, dynamically calculating the appropriate snoop response after address bus tenure could slow system throughput and would require substantial resources in terms of registers and logic elements.

SUMMARY OF THE INVENTION

It is an object of the invention to provide an apparatus and method for maintaining cache coherency in a data processing system having multiple processors which share a pipelined address bus. More particularly, it is an object of invention to provide an apparatus and method by which a processor sharing an address bus may identify each younger conflicting address bus operation and provide an appropriate response depending upon the result of the processor's own address bus operation.

The apparatus according to the invention comprises a contingent response unit included in each processor of a multiple processor system. Each contingent response unit identifies each pending operation from the respective processor which specifies an address also specified in a younger or later operation from another processor. These matched pending operations from the respective processor are then tracked so that the response to the younger conflicting operation is contingent upon the result of the pending operation. Specifically, the contingent response unit makes the appropriate response to a younger conflicting operation only if the matched pending operation finishes the address bus pipeline successfully, that is, without receiving a retry snoop response.

Each contingent response unit includes a pending operation unit, a snoop pipeline including a plurality of pipeline stages, and a contingent response flag control arrangement associated with the snoop pipeline. When the pending operation unit for a first processor detects or snoops a conflicting address operation from a second processor, the contingent response flag control arrangement sets a contingent response flag in a first snoop pipeline stage for the matched operation. The matched operation comprises the pending operation from the first processor which specifies an address matched by the address specified in the younger conflicting operation. In addition to setting the contingent response flag, the contingent response flag control arrangement also causes the first snoop pipeline stage to store an identifier which identifies the matched pending operation. In the event that the matched operation receives a retry response from another processor or system resource, the contingent response flag control arrangement clears the contingent response flag for the matched operation. However, if the matched operation does not receive a retry response within its snoop response window, the contingent response flag for the matched operation remains set and is used to produce a retry response for the conflicting operation from the second processor.

One advantage of the invention is that each matched operation from the respective processor is identified while the matched operation is pending on the address pipeline. This address conflict identification is accomplished with simple logic and a minimal amount of system resources. Once the comparison is performed to identify any matched operation, the snooped address is no longer needed and need not be stored. Also, only the younger conflicting operations which must receive a snoop response actually receive such a response. That is, younger conflicting operations from another processor receive the indicated response only if the first processor's operation is successful on the address bus pipeline. Operations from the first processor which themselves receive a retry response, and are thus unsuccessful, do not cause a younger conflicting address operation to receive the indicated response. This elimination of unnecessary snoop responses effectively increases address bus bandwidth.

The contingent response unit according to the invention also avoids "ping-pong" deadlocks in which two processors with overlapping address operations continuously cause each other to be retried. While such deadlocks have previously been broken by detection or pacing logic, the present contingent response units prevent ping-pong deadlocks from arising.

The pending operation unit included in each contingent response unit identifies each matched operation from the respective processor and provides information regarding each matched operation to the response flag control arrangement. In the preferred form of the invention, the pending operation unit includes a pending operation queue having a plurality of queue locations. Each queue location stores at least the address specified in a first processor operation which is then pending on the pipelined address bus. The pending operation unit also preferably includes a pending operation queue comparator arrangement. This comparator arrangement receives each snoop address from another processor sharing the pipelined address bus and compares the respective snoop address with the address stored in each pending operation queue location in order to identify each matched operation.

In some forms of the invention, each pending operation queue location may also store an operation type associated with the respective pending operation. In these forms of the invention, the pending operation unit may produce different outputs depending upon the type of matched operation and the type of operation snooped from the address bus. These different outputs may be used to set different contingent response flags which are in turn used to produce an appropriate response to a younger conflicting operation. For example, the pending operation arrangement may produce a "contingent shared" output when the matched operation comprises a load-type operation and the snoop address is associated with a load-type operation. When the matched operation type comprises a store-type operation, however, the pending operation arrangement may generate a "contingent modified" output. Each different output is used to set a particular contingent response flag in the first snoop pipeline stage.

The number of stages in the snoop pipeline corresponds to the number of address bus clock cycles in the snoop response window. Each snoop pipeline stage includes a location for storing at least one contingent response flag, and also includes a location for storing an operation identifier. The operation identifier identifies a particular matched operation and preferably comprises a unique index value. This index value may be produced by a suitable encoder using the output from the pending operation queue comparator arrangement.

In each address pipeline clock cycle, the contents of each particular snoop pipeline stage, including any uncleared contingent response flags, are transferred to the next subsequent pipeline stage until reaching the final snoop pipeline stage. Any contingent response flags remaining set in the final snoop pipeline stage are transferred each address bus clock cycle to a response controller. The response controller produces an appropriate snoop response based on any contingent response flag remaining set in the final snoop pipeline stage.

The contingent response flag control arrangement includes flag clearing logic associated with each critical snoop pipeline stage. As used in this disclosure and the accompanying claims a "critical snoop pipeline stage" comprises a snoop pipeline stage in which the matched operation could potentially finish the address bus pipeline. The number of critical snoop pipeline stages corresponds to a critical period after an address is snooped from the system address bus. The flag clearing logic clears the contingent response flag when an identifier from the respective snoop pipeline stage matches an identifier for the operation then finishing the address bus pipeline with a retry response.

In the preferred form of the invention, the flag clearing logic comprises a flag control comparator, a validity AND gate, and at least one flag control AND gate. The flag control logic will include one flag control AND gate for each contingent response flag location in a snoop pipeline stage. Each flag control comparator receives the identifier from a finishing operation and compares that identifier with the identifier stored in the respective snoop pipeline stage. The validity AND gate associated with each flag control comparator passes a positive comparator output only if enabled by a validity signal associated with the finishing operation. Each flag control AND gate receives two inputs. A first input of each flag control AND gate is connected to receive the contents of one contingent response flag location from the respective snoop pipeline stage. A second input is connected to receive the inverted comparator/validity AND gate output of the respective snoop pipeline stage. An output of each flag control AND gate is connected to one contingent response flag location of the next succeeding snoop pipeline stage.

With this preferred flag clearing logic arrangement, the flag control comparator/validity AND gate combination associated with a given snoop pipeline stage selectively clears any contingent response flag in the event that the index stored in the respective pipeline stage matches the index of an operation finishing the address pipeline having been retried.

These and other objects, advantages, and features of the invention will be apparent from the following description of the preferred embodiments, considered along with the accompanying drawings.

DESCRIPTION OF THE PREFERRED EMBODIMENTS

Figure 1:
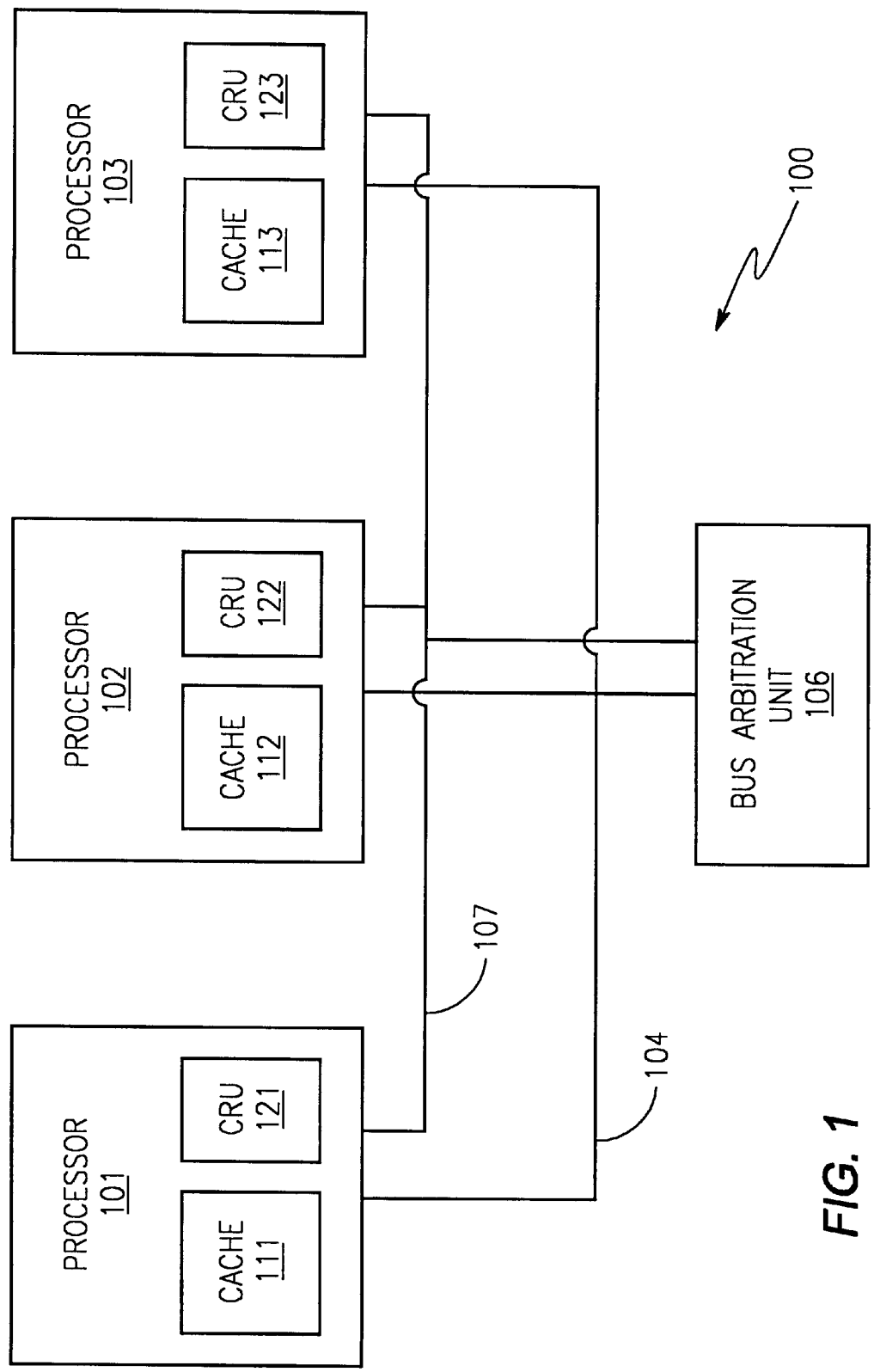
FIG. 1 is a diagrammatic representation of a data processing system employing a contingent retry apparatus embodying the principles of the invention.

FIG. 1 shows a data processing system 100 in which the invention may be employed. Data processing system 100 includes multiple independent processors 101, 102, and 103, each processor sharing a single address bus 104. Data processing system 100 also includes a bus arbitration unit 106 which arbitrates between address bus operations from the independent processors 101, 102, and 103. Bus arbitration unit 106 and each of the independent processors 101, 102, and 103 are connected to a retry signal line 107. Also, each independent processor 101, 102, and 103 includes cache memory, 111, 112, and 113, respectively. According to the invention, each processor 101, 102, and 103 also includes a contingent response unit 121, 122, and 123, respectively.

Although not shown in the drawing, those skilled in the art will appreciate that address bus 104 is also connected to main memory which is shared by the various independent processors. A data bus is also shared by the independent processors 101, 102, and 103. The main memory, data bus, and other related connections are omitted from FIG. 1 so as not to obscure the invention in unnecessary detail.

Operations on address bus 104 are pipelined in multiple pipeline stages. For example, an address from one processor 101, 102, or 103 may be driven onto address bus 104 in a first address bus pipeline stage and may pass through several other address bus pipeline stages before the operation finishes. As in other pipelined processing arrangements, each stage in a given pipestage period processes or holds a different address bus operation so that multiple operations are pending on the address bus pipeline at any given time. As will be discussed below with reference to FIGS. 3 and 4, the address tenure on the address bus pipeline may be several address bus clock cycles.

Figure 2A:
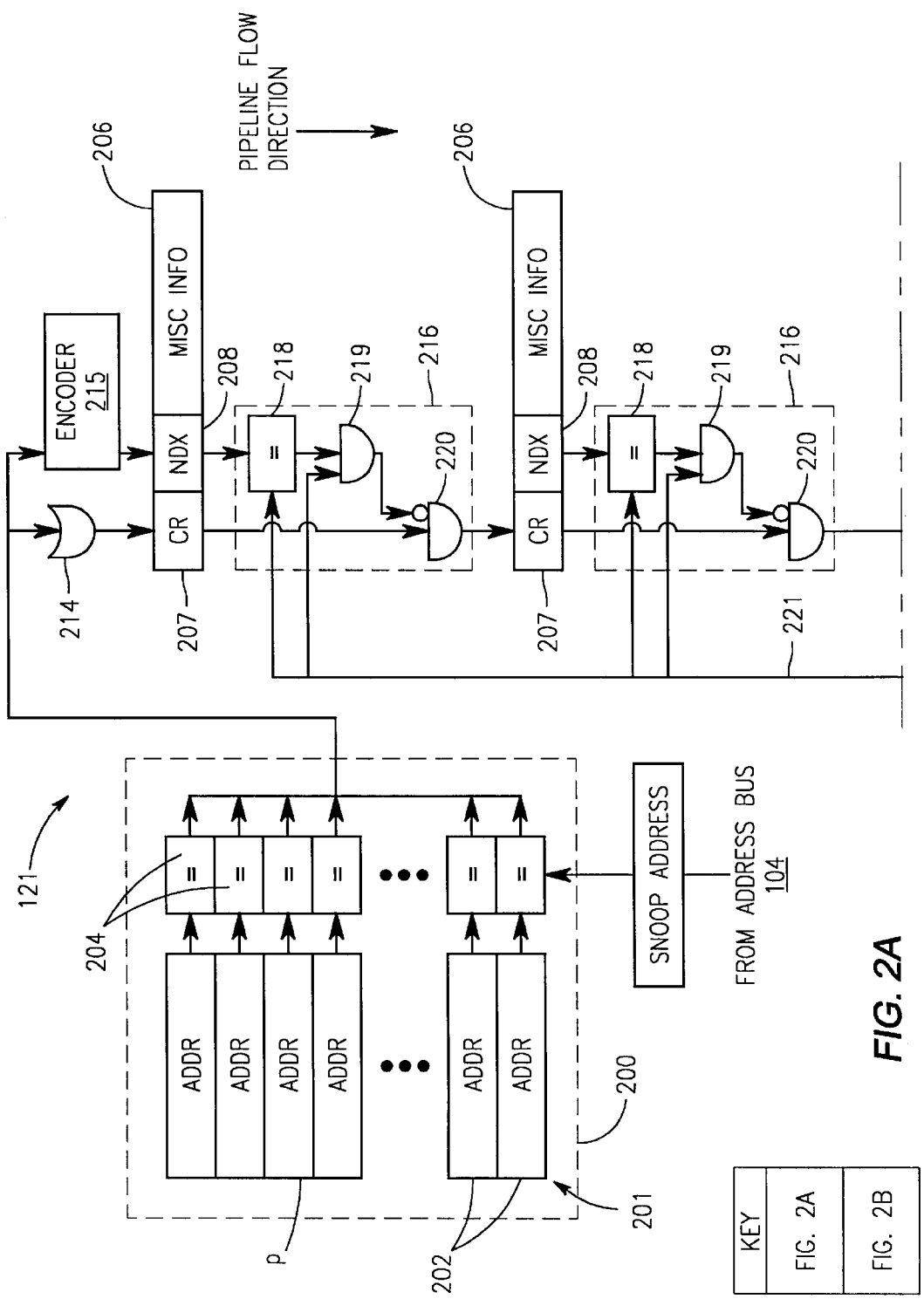
FIGS. 2A and 2B together are a diagrammatic representation of the contingent retry apparatus shown in FIG. 1.
Figure 2B:
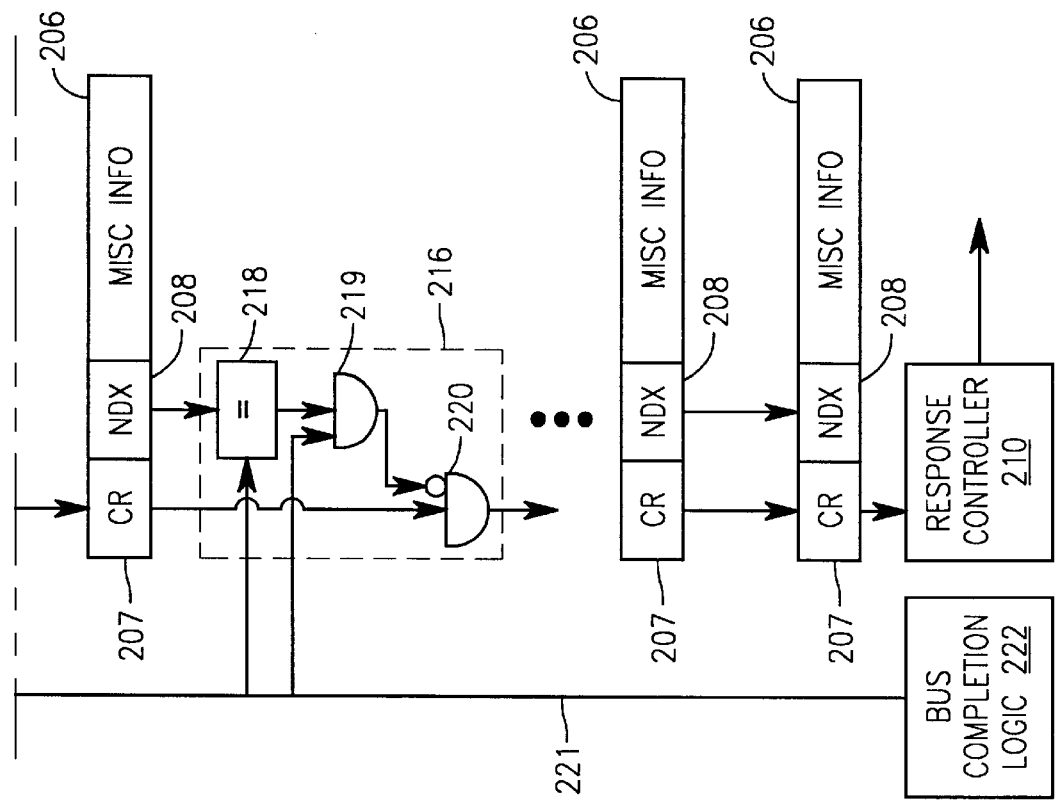

FIGS. 2A and 2B illustrate contingent response unit 121. The contingent response units 122 and 123 associated with the other processors are identical to unit 121. In this implementation of the invention, contingent response unit 121 controls a retry response to read-type operations snooped from address bus 104. As used in this disclosure a read-type operation may comprise a cacheable read operation or a cacheable store operation.

Contingent response unit 121 includes a pending operation unit shown at reference numeral 200. Pending operation unit 200 preferably includes a pending operation queue 201 having a plurality of queue locations 202. The number of queue locations 202 required for a particular implementation is equal to or greater than the maximum number of operations from the respective processor which may be pending on the address pipeline at a given time. Each queue location 202 comprises a suitable register and is adapted to store an address associated with a address bus operation currently pending in the address bus pipeline from processor 101. Pending operation unit 200 also includes a comparator arrangement including an address comparator 204 for each pending operation queue location 202. Each comparator 204 is adapted to receive a snoop address for an operation driven onto address bus 104 by one of the other processors, 102 or 103 shown in FIG. 1, and to compare that snoop address with the address stored in the respective pending operation queue location 202. The output of the comparators 204 comprises a bit mask which indicates any pending address bus operation which specifies an address also specified by an operation snooped from address bus 104. Such a pending operation will be referred to in this disclosure and the accompanying claims as a "matched operation."

Contingent response unit 121 also includes a snoop pipeline comprising a plurality of pipeline stages 206. Each stage 206 comprises a register having a contingent retry flag location 207 and an identifier or index location 208. Each stage 206 may also include locations for other information unrelated to the operation of the present invention. Contingent retry flag location 207 may comprise a single memory cell and is adapted to store a contingent retry flag as will be discussed in detail below. Index location 208 may comprise several memory cells in the respective register depending upon the number of stages in the address bus pipeline and is adapted to store an identifier for a particular matched operation identified by pending operation unit 200.

The uppermost snoop pipeline stage 206 in FIG. 2A comprises a first snoop pipeline stage. Each address bus pipeline stage after an entry is made in the first snoop pipeline stage, the respective entry shifts down to the next adjacent snoop pipeline stage, subject to any flag clearing operation which will be described below. The final snoop pipeline stage comprises lowermost stage 206 shown in FIG. 2B. The contents of the entry in the final snoop pipeline stage 206 are applied to response controller 210 which operates to produce the appropriate response to the snoop operation which prompted the particular snoop pipeline entry.

Contingent response unit 121 also includes a contingent response flag control arrangement associated with the snoop pipeline. The contingent response flag control arrangement includes an OR gate 214 adapted to receive the bit mask output from pending operation unit 201. The preferred form of the invention additionally includes an encoder 215 which also receives the pending operation unit bit mask output and produces an index value identifying a matched operation.

The contingent retry flag control arrangement also includes flag clearing logic shown generally at reference numeral 216 associated with each snoop pipeline stage 206 except the last two stages. Flag clearing logic 216 includes a flag control comparator 218, a validity AND gate 219, and a flag control AND gate 220. Each flag control comparator 218 receives the index from the snoop pipeline stage 206 with which the respective comparator is associated and also receives the index of the address bus operation then finishing the address bus pipeline. This later index is received from an internal index bus 221 from a bus completion logic unit 222 associated with the respective contingent response unit 121. The bus completion logic unit stores the index value of each transaction placed on the address bus and returns the index value on bus 221 when the transaction completes the address bus. The respective validity AND gate 219 receives as its inputs the output of the respective comparator 218 and a validity signal preferably carried on index bus 221. Each flag control AND gate 220 has a first input connected to the contingent retry flag location 207 of the respective snoop pipeline stage 206 with which the particular logic 216 is associated. A second input to flag control AND gate 220 is connected to receive the inverted output of the respective flag control comparator 218, when enabled through validity AND gate 219.

No flag clearing logic is associated with the last two snoop pipeline stages 206 because these stages are outside of the critical period after an operation is snooped from address bus 104 by contingent response unit 121. That is, by the time an entry in the snoop pipeline reaches the next to the last stage 206, the matched operation associated with the entry will have already passed its own snoop response window. By this time the matched operation will have either received a retry response or will have finished without such a response.

Figure 3:
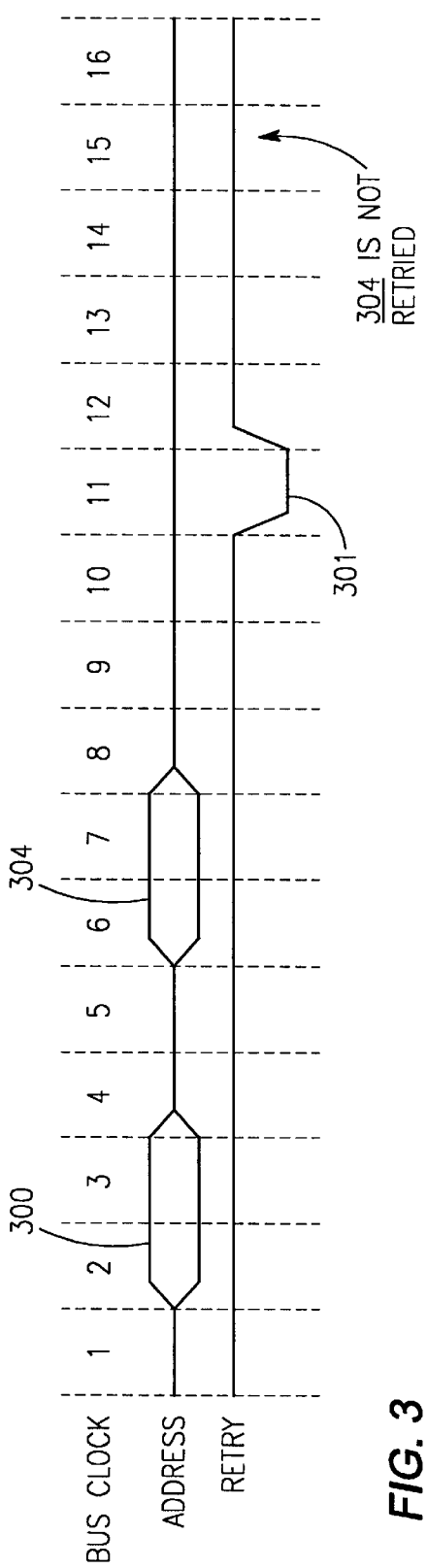
FIG. 3 is a timing chart illustrating the operation of the contingent retry apparatus shown in FIGS. 1 and 2.

The operation of the contingent response unit 121 and the method of the invention as applied to the contingent retry situation may be described with reference to the apparatus shown FIGS. 1, 2A and 2B, and with reference to the timing charts shown in FIGS. 3 and 4. Referring to FIGS. 1 through 3, the operation of the apparatus will first be described in the situation in which a first processor, processor 101, drives an address bus operation 300 onto the address bus and later receives a retry signal 301 for the operation. As shown in FIG. 3, read-type operation 300 is driven onto address bus 104 (FIG. 1) in address bus clock cycles two and three. Those skilled in the art will appreciate that other implementations of the invention may drive operations onto the address bus in only one clock cycle or more than two clock cycles. In any event, as the address bus operation is driven onto the address bus 104, the address specified in the particular address bus operation is also loaded into one of the pending operation queue locations 202, location P for example, in FIG. 2A. After operation 300 enters the address bus pipeline, the operation progresses through the various pipeline stages until finishing at clock cycle twelve. In the example shown in FIG. 3, operation 300 receives retry signal 301 in clock cycle eleven. The retry signal is asserted on line 107 shown in FIG. 1. It will be appreciated that although nine clock cycles are required from address to response in the illustrated form of the invention, more or fewer clock cycles may be required in other implementations of the invention.

While operation 300 is pending on the address bus pipeline, FIG. 3 shows that a second processor, for example processor 102 in FIG. 1, entered an operation 304 on the address bus 104 in clock cycles six and seven. Operation 304 represents a conflicting operation specifying the same address as the address specified in operation 300. As operation 304 is driven onto address bus 104 in FIG. 1, the address specified in the operation is snooped by processor 101 and is received by the pending operation comparators 204 shown in FIG. 2A. Pending operation comparators 204 compare this snoop address to the addresses in pending operation queue locations 202. In this case, the pending operation comparators 204 produce a bit mask showing a positive comparison result from the comparator associated with queue location P in FIG. 2A. This positive comparison result identifies the operation associated with queue location P as a matched operation. The rest of the comparator results show a negative comparison. In clock cycle seven in FIG. 3, this bit mask is applied to OR gate 214 which produces a positive output to set a contingent retry flag in the contingent retry flag location 207 in the first (uppermost) snoop pipeline stage 206 shown in FIG. 2A. The bit mask from comparators 204 is also applied to encoder 215 which produces a unique index value associated with the matched operation associated with queue location P in queue 201. This index value is stored in the index location of the first snoop pipeline stage 206 and together with the contingent retry flag and any miscellaneous information comprises an entry in the first snoop pipeline stage.

In the clock cycle after this entry is made in the first snoop pipeline stage 206, the contingent retry flag set in location 207 and index in location 208 pass through the flag clearing logic 216 associated with the respective snoop pipeline stage, and the results of the logical operations are applied to the contingent retry flag location 207 of the next snoop pipeline stage. In clock cycle eight shown in FIG. 3, the index value associated with the matched operation 300 and the contingent retry flag are written into the second snoop pipeline stage 206 immediately below the uppermost stage in FIG. 2A. Since the matched operation 300 does not finish the address pipeline in this clock cycle, the output of the flag control comparator 218 associated with the first snoop pipeline stage is negative and even if the validity signal is asserted, this negative output is inverted to apply the second input to flag control AND gate 220. This inverted signal essentially enables AND gate 220 to pass the contingent retry flag on to the contingent retry flag location 207 of the second snoop pipeline stage 206 immediately below the uppermost stage.

Processor 101 receives a retry response to its operation 300 in clock cycle eleven shown in FIG. 3. In the following clock cycle the index assigned to operation 300 by encoder 215 in FIG. 2A is applied on the internal index bus 221. Also the validity signal is asserted on index bus 221 since the operation was retried. The entry in the snoop pipeline due to the conflicting operation 304 is now held in the fifth snoop pipeline stage 206. Thus, when the index for operation 300 is applied to the index bus 221, the output of the flag control comparator 218 associated with the fifth snoop pipeline stage is positive and enabled through the respective validity AND gate 219. This output is inverted to produce a "low" or disabling input to the respective flag control AND gate 220. Thus, in clock cycle twelve shown in FIG. 3, the flag control AND gate 220 of the fifth snoop pipeline stage blocks the contingent retry flag from passing to the sixth snoop pipeline stage. This effectively clears the contingent retry flag in the sixth snoop pipeline stage 206.

The state of the contingent retry flag location 207 in the final snoop pipeline stage 206, and perhaps other information, is used by the response controller 210 to produce the appropriate response to operation 304 from processor 102. Since the contingent retry flag has been cleared, the response controller 210 does not produce a retry signal in clock cycle fifteen, the end of the snoop response window for operation 304.

Figure 4:
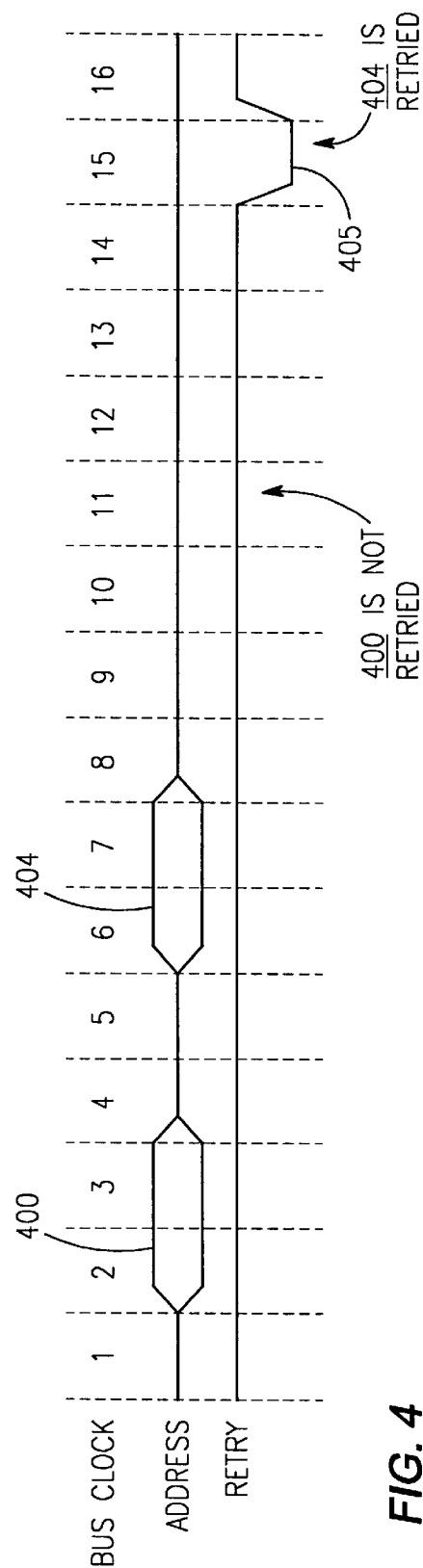
FIG. 4 is a timing chart illustrating the situation in which the contingent retry apparatus prevents an unnecessary retry response.

The timing chart of FIG. 4 illustrates the situation in which address bus operation 400 from processor 101 does not receive a retry response within the operation's snoop response window. As in the example shown in FIG. 3, processor 102 enters a conflicting address bus operation 404 onto address bus 104 in clock cycles six and seven. The address of operation 404 is snooped by the pending operation unit 200 in FIG. 2A and results in an entry setting a contingent retry flag in the first snoop pipeline stage 206 as described above with reference to operation 300 in FIG. 3. In the subsequent clock cycles, the contingent retry flag and index value for operation 400 shift down through the snoop pipeline stages similarly to the entry for operation 300. However, since address operation 400 finishes the address pipeline successfully, that is without receiving a retry response, the contingent retry flag is never cleared from the corresponding pipeline stage entry. It will be noted that the index value associated with operation 400 may be driven on index bus 221 but a positive flag control comparator output may be blocked at validity AND gate 219 by deasserting the validity signal. In any event, when the entry for address bus operation 400 reaches the final snoop pipeline stage 206, the response controller 210 uses the contingent retrying flag in flag location 207 to produce a retry signal 405 for address bus operation 404.

As illustrated in FIGS. 3 and 4, the younger conflicting operation receives a retry response based on the older operation only in the appropriate situation. That is, the younger conflicting operation 404 receives a retry response 405 because the older operation 400 is successful and processor 101 gains control of the data at the specified memory address. As shown particularly in FIG. 3, the younger conflicting operation 304 does not receive a retry response based on older operation 300 because that operation is itself unsuccessful and processor 101 does not gain control of the data at the specified memory address.

Figure 5:
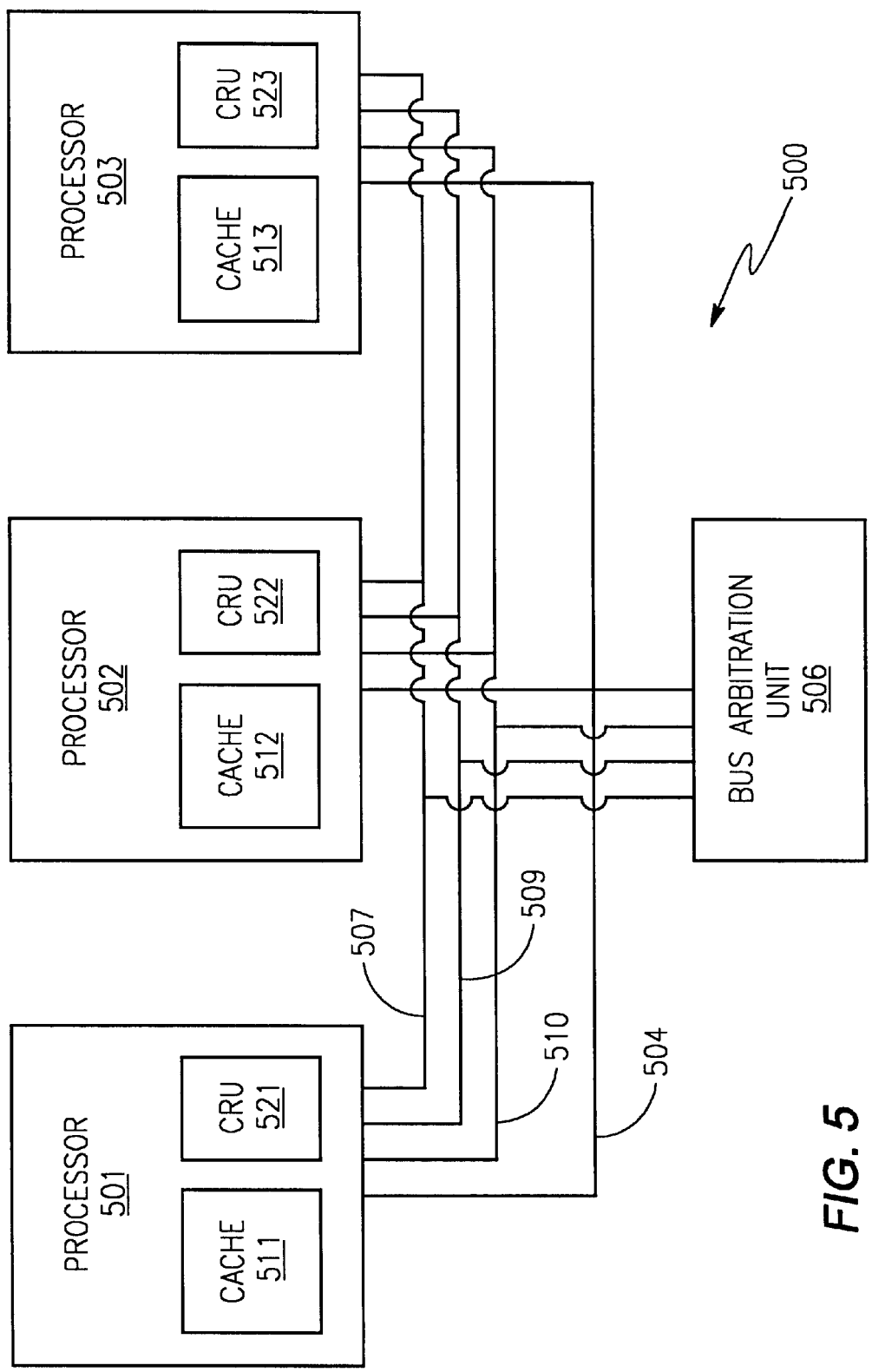
FIG. 5 is a diagrammatic representation of a data processing system employing an alternate contingent response apparatus according to the invention.
Figure 6A:
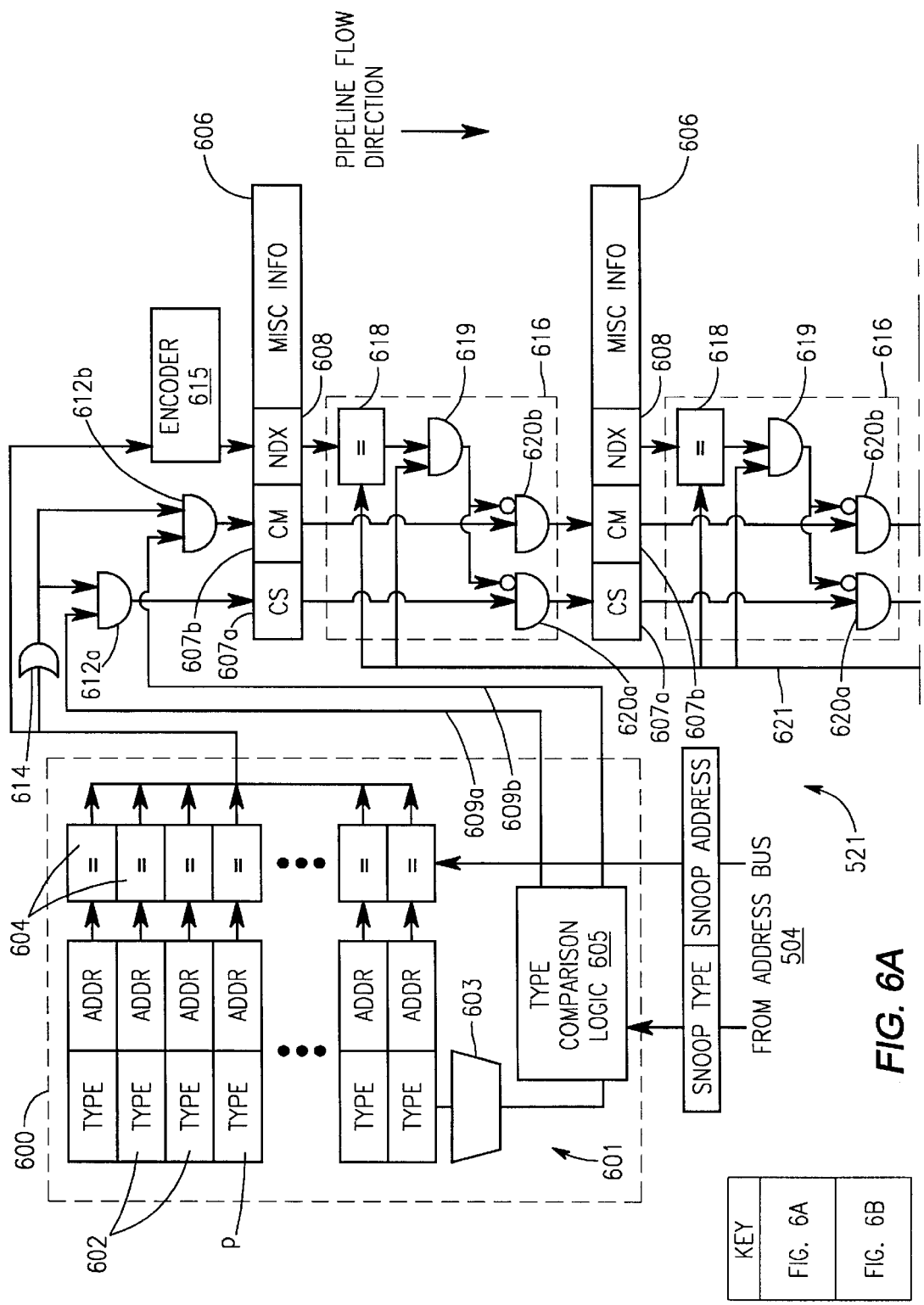
FIGS. 6A and 6B together are a diagrammatic representation of the contingent response apparatus shown in FIG. 5.
Figure 6B:
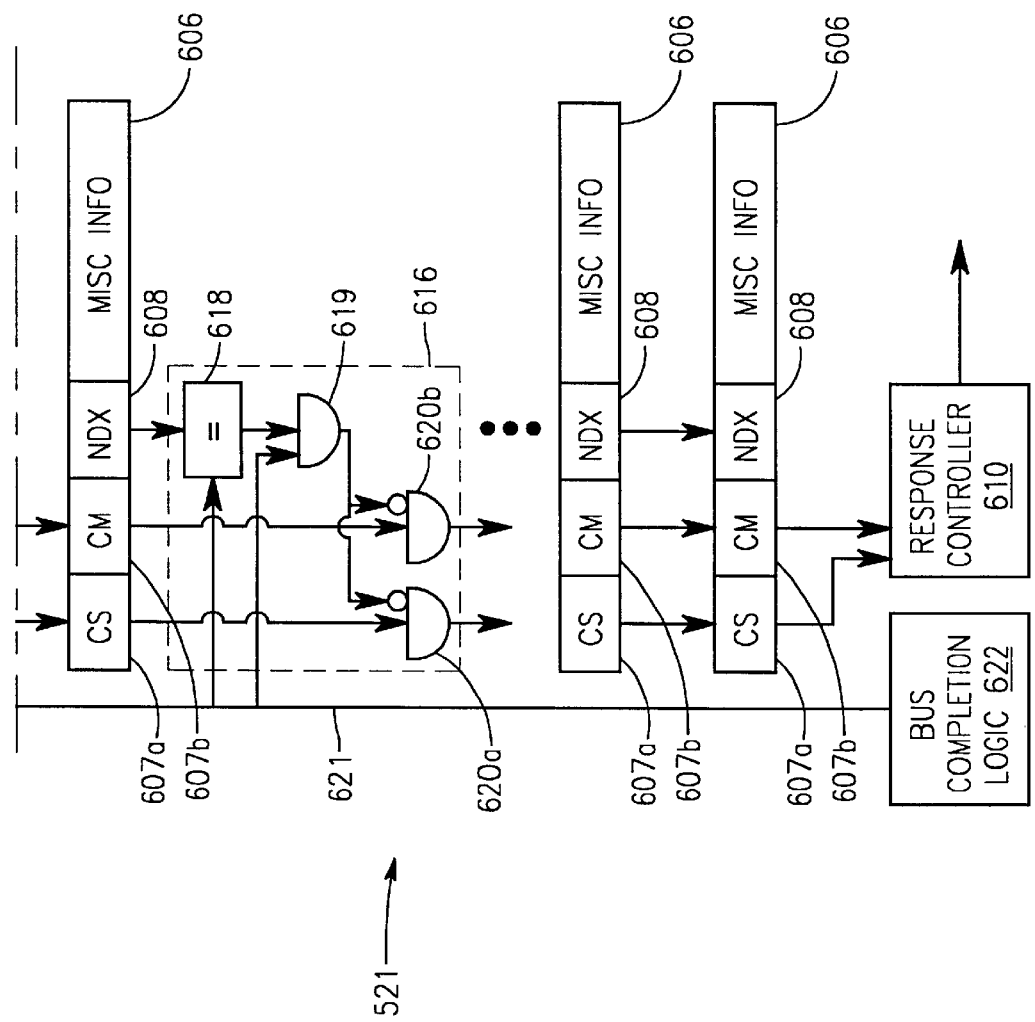

FIG. 5 illustrates a multiple processor system 500 utilizing alternate contingent response units 521, 522, and 523 embodying the principles of invention. FIGS. 6A and 6B show one of these alternate contingent response units, unit 521. The other units 522 and 523 are identical to contingent response unit 521. This alternate form of contingent response unit is adapted to provide different snoop responses depending upon the type of address bus operation pending from the respective processor and the type of address bus operation snooped from another processor.

Referring to FIG. 5, the processing system 500 includes processors 501, 502, and 503, including local cache memory 511, 512, and 513, respectively, and sharing a common address bus 504. The address bus operation is pipelined similarly to the bus 104 shown in FIG. 1 and described above. System 500 also includes an arbitration unit 506 similar to the address bus arbitration unit 106 shown FIG. 1. Each of the processors 501, 502, and 503 also share a retry line 507 similar to line 107 in FIG. 1. Data processing system 500 also includes a "shared response" line 509 and a "modified response" line 510 connected between each processor 501, 502, and 503, and also the arbitration unit 506.

Referring to FIGS. 6A and 6B, contingent response unit 521 includes a pending operation unit 600, a snoop pipeline having a plurality of pipeline stages 606, response controller 610, and a contingent response flag control arrangement including flag clearing logic 616 associated with the snoop pipeline. Unlike contingent response unit 121 shown in FIGS. 2A and 2B which controls retry snoop responses, contingent response unit 521 is adapted to control a "shared" response and a contingent modified response to an operation snooped from the address bus. These responses support a MESI protocol in the multiple processor system 500 shown in FIG. 5.

Referring again to FIG. 6A, pending operation unit 600 includes a pending operation queue 601 having a plurality of queue locations 602 and a comparator arrangement 604. Similar to pending operation unit 200 shown FIG. 2A, the pending operation unit 600 serves to identify each matched operation, that is, each pending operation from the respective processor which specifies an address which matches the address specified in a younger operation snooped from the address bus (504 in FIG. 5). Each pending operation queue location 602 is adapted to store an address specified in an operation from the respective processor which is pending on the address bus pipeline. In addition to the specified address, each queue location 602 includes additional space for storing an operation type associated with the respective pending operation. The operation type in this form of invention may be a "load" or a "store." As in the form of the invention shown in FIGS. 2A and 2B, the comparators 604 are adapted to receive an address snooped from address bus 504 and compare the address with each address in the respective pending operation queue location 602 to produce a bit mask output. A positive comparison at a location in this bit mask output indicates a matched pending operation.

Pending operation unit 600 shown in FIG. 6A further includes a multiplexer 603 adapted to use the bit mask output from comparators 604 to select one operation type from the pending operation queue 601. This operation type comprises the operation type of the matched operation. The operation type of the matched operation is applied to type comparison unit 605. Type comparison unit 605 receives the operation type from multiplexer 603 and also receives an operation type snooped from the address bus (504 in FIG. 1) along with the address utilized by comparators 604. If the operation type from multiplexer 603, that is, the operation type associated with the matched operation, comprises a load-type operation and the snooped operation includes a load-type operation, type comparison unit 605 produces a contingent shared output signal on line 609a. However, if the matched operation comprises a store-type operation and the snooped operation includes either a load-type or store-type operation, type comparison unit 605 produces a contingent modified output on line 609b.

The snoop pipeline in the form of the invention shown in FIGS. 6A and 6B is similar to that disclosed in FIGS. 2A and 2B. However, rather than having a contingent retry flag location, each snoop pipeline stage includes a contingent shared flag location 607a and a contingent modified flag location 607b. Each snoop pipeline stage also includes an identifier location 608 which stores an identifier identifying the matched operation similar to location 208 in FIGS. 2A and 2B. An encoder 615 is preferably provided for producing an index value using the bit mask output from comparators 604. Each snoop pipeline stage 606 may also include locations for other information which is unrelated to the operation of the contingent response unit. As in the form of the invention shown in FIGS. 2A and 2B, the snoop pipeline includes the same number of stages as the stages included in the address bus pipeline. Also, the snoop pipeline is clocked similarly to the address bus pipeline so that the contents of each snoop pipeline stage shifts down to the next pipeline stage in each address bus clock cycle.

The contingent response flag control arrangement in contingent response unit 521 includes a snoop pipeline stage loading OR gate 614 similar to gate 214 in FIG. 2A. However, since each snoop pipeline stage includes two separate contingent response flag locations 607a and 607b, loading AND gates 612a and 612b are included for setting the flag in the appropriate flag location. Both AND gates 612a and 612b receive the output of OR gate 614 at one input and either the signal on line 609a or 609b at the other input. The output of AND gate 612a is applied to the contingent shared flag location of the first snoop pipeline stage 606, while the output of AND gate 612b is applied to the contingent modified flag location 607b of the first snoop pipeline stage. The signal which is asserted from type comparison unit 605 results in the appropriate contingent response flag being set in either location 607a or 607b.

Contingent response flag location clearing logic 616 associated with each snoop pipeline stage 606 except the last two stages comprises a flag control comparator 618, a validation AND gate 619, and a flag control AND gate 620a and 620b for each contingent response flag location (607a and 607b in the illustrated form of the invention). Each flag control comparator 618 receives the index from the pipeline stage with which it is associated and compares the index with the index driven on internal index bus 621 by bus completion logic unit 622. This latter index value comprises the index of the address operation then finishing its tenure on the address bus. As in the embodiment shown in FIG. 2B, the index of this finishing operation is provided by the bus completion logic unit 622.

The output of the respective flag control comparator 618 is applied as a first input to validation gate 619. The second input to validation AND gate 619 comprises a validation signal which is preferably included on the index bus 621 similarly to the arrangement shown in FIGS. 2A and 2B. This validation signal is asserted only when the operation represented by the index value has received a retry response from unit 506 in FIG. 5 or some other system resource. The output of validation AND gate 619 is inverted and then applied as a controlling input to each AND gate 620a and 620b. AND gate 620a receives the contents of the contingent shared flag location 607a as a second input, while AND gate 620b receives the contents of the contingent modified flag location 607b as its second input. The output of AND gate 620a is applied to the contingent shared flag location 607a of the next adjacent snoop pipeline stage while the output of AND gate 620b is applied to the contingent modified flag location 607b of the next adjacent snoop pipeline stage.

Figure 7:
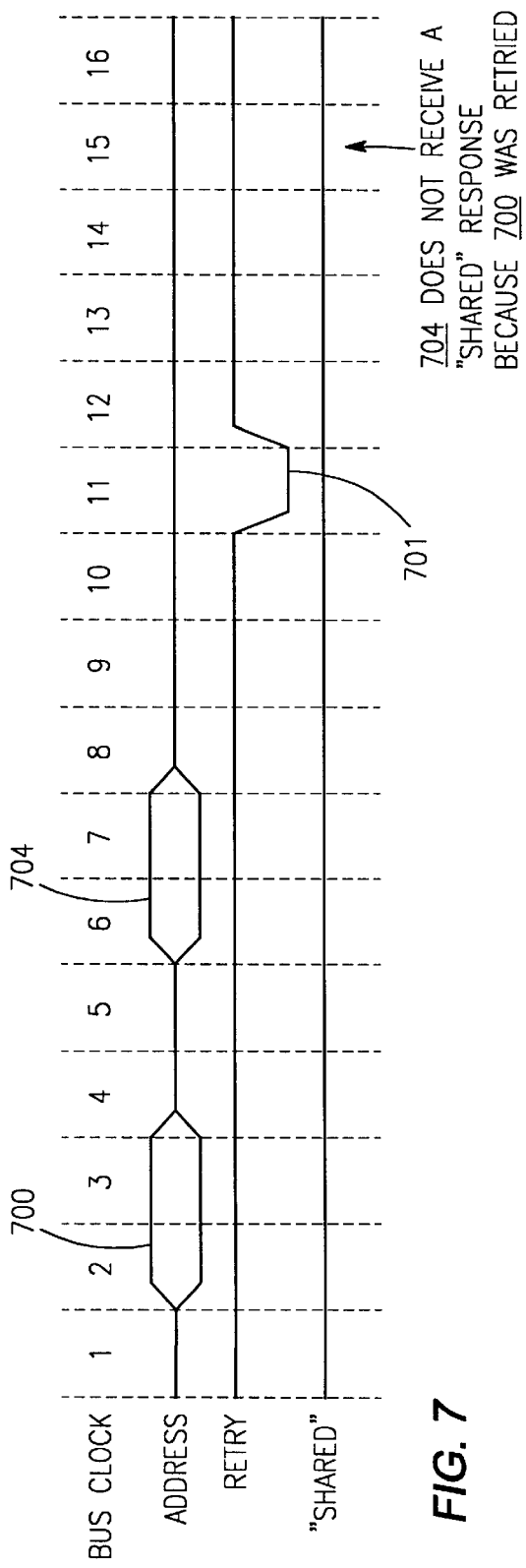
FIG. 7 is a timing chart illustrating the operation of the contingent retry apparatus shown in FIGS. 5 and 6.

The operation of contingent response unit 521 shown in FIGS. 5, 6A and 6B may be described with reference to the timing charts of FIGS. 7 and 8. Referring particularly to FIGS. 5, 6A, 6B, and 7 processor 501 drives address bus operation 700 on address bus 504 in clock cycles two and three. Operation 700 comprises a load-type operation and specifies an address comprising a particular cache line in cache memory 511, 512, or 513. For the purposes of this example, the address and operation type are stored in queue location P in pending operation queue 601 in FIG. 6A.

As shown in FIG. 7, a second processor in system 500, processor 502 for example, drives operation 704 on address bus 504 in address bus clock cycles six and seven. Operation 504 comprises a load-type operation and specifies the same address specified in operation 700. As processor 502 drives operation 704 on address bus 504, contingent response unit 521 of processor 501 snoops the address and operation type. The snooped address is applied to the comparators 604 in FIG. 6A, while the snoop operation type is applied to type comparison unit 605. Since the address specified in operation 704 is the same address as that specified in operation 700 and stored at queue location P, the output of comparators 604 comprises a bit mask showing a positive comparison or match for operation 700. The bit mask is applied to multiplexer 603 to pass the operation type in queue location P to type comparison unit 605. Since the operation type from the pending operation queue comprises a load-type operation and the snooped operation type comprises a load-type operation, operation type comparison unit 605 asserts a contingent shared output on line 609a and leaves line 609b unasserted.

The bit mask output from comparators 604 is also applied to OR gate 614 and encoder 615. Encoder 615 uses the bit mask to produce a unique index value (operation identifier) and directs the index value to the first or uppermost snoop pipeline stage 606 to be stored in the index or identifier location 608. This index identifies pending operation 700 which specifies the address stored in queue location P in the pending operation queue 601 and which produced the single match output from the comparators 604. In the same clock cycle, OR gate 614 produces a positive output which enables AND gate 612a to set a contingent shared flag in the contingent shared flag location 607a in the first snoop pipeline stage 606. However, since no signal is asserted on 609b AND gate 612b does not set a contingent modified flag in contingent modified flag location 607b in first pipeline stage 606.

In the following address bus clock cycle, clock cycle eight in FIG. 7, this entry in the snoop pipeline stage comprising the set contingent shared flag, the index identifying operation 700, and any additional information shifts down to the second snoop pipeline stage 606 immediately below the first stage in FIG. 6A. Since in clock cycle eight no matching index is applied on index bus 621, the output from flag control comparator 618 is not asserted and thus the output from validation AND gate 619 is also not asserted. This output is inverted and applied to AND gates 620a and 620b to enable the gates to pass the contents of locations 607a and 607b in first snoop pipeline stage 606 to the second snoop pipeline stage. Since the contingent shared flag has been set in location 607a of the first snoop pipeline stage, the flag propagates through AND gate 620a to flag location 607a in the second snoop pipeline stage 606. Also, since the contingent modified flag has not been set in location 607b of the first stages 606, AND gate 620b produces a negative output which is stored in the contingent modified flag location 607b in the second snoop pipeline stage 606.

As shown in FIG. 7, operation 700 receives a retry response 701 at the end of its snoop response window shown at clock cycle eleven. In the following clock cycle, the index for the unsuccessful finishing operation 700 along with a validity bit are driven on index bus 621 by bus completion logic unit 622 in FIG. 6B. In this clock cycle, the snoop pipeline stage then holding the entry for the matched operation 700 produces a positive output from the respective flag control comparator 618. Since the respective validation AND gate 619 is enabled by a validation signal on the index bus 508, the positive output is passed through validation AND gate 619 and inverted to disable AND gates 620a and 620b. Thus, AND gate 620a is unable to pass the contingent shared flag to the next snoop pipeline stage 606. This effectively clears the contingent shared flag in address bus clock cycle twelve shown in FIG. 7. With the contingent shared flag cleared, response control unit 610 does not produce a "shared" response at the end of the snoop response window (clock cycle fifteen) for operation 704.

Figure 8:
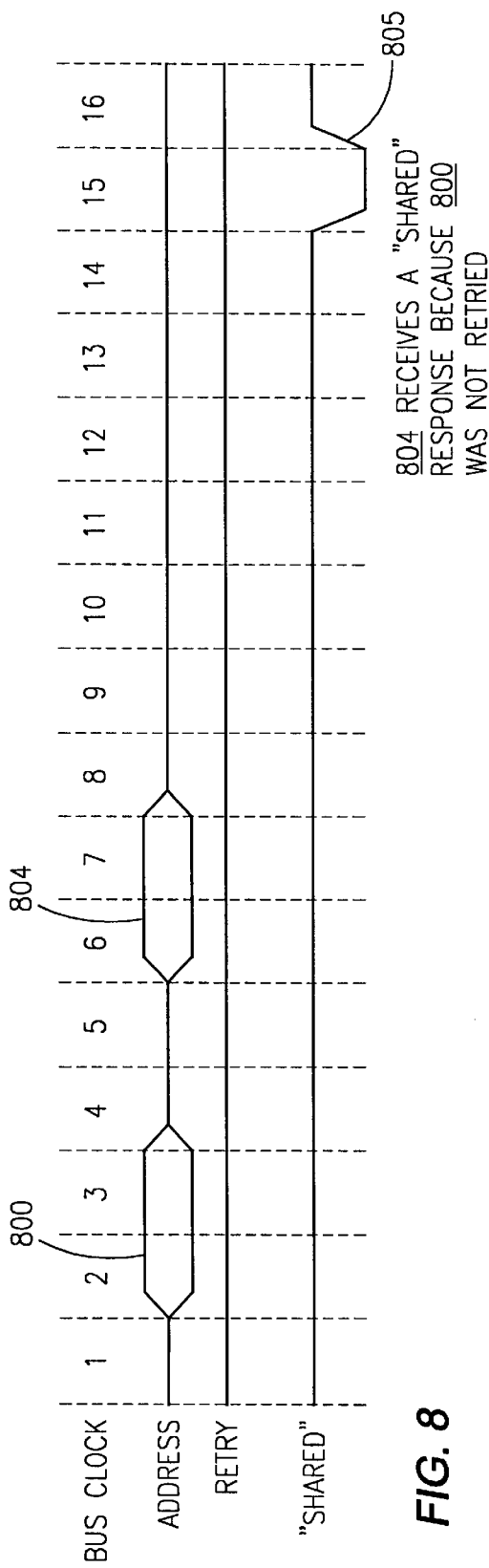
FIG. 8 is a timing chart showing the operation of the contingent response apparatus to prevent an unnecessary "shared" response.

Referring to FIG. 8, operations 800 and 804 from processors 501 and 502 are driven on the address bus similarly to operations 700 and 704 shown in FIG. 7. Thus, in clock cycles six and seven in FIG. 8, the pending operation unit 600 and contingent response flag control arrangement cooperate to produce an entry in the first snoop pipeline stage comprising a contingent shared flag at location 607a, no contingent modified flag at location 607b, and the index for the matched operation, operation 800, at location 608. However, unlike the situation shown in FIG. 7, operation 800 from processor 501 finishes the address bus pipeline successfully without receiving a retry response at clock cycle eleven. Thus, in clock cycle twelve the flag control comparator 618 associated with the respective snoop pipeline stage 606 does not produce a positive output to cause AND gate 620a to block or clear the contingent shared flag from location 607a of that pipeline stage 606. Therefore, the response controller 610 uses the contingent shared flag from the final or lowermost snoop pipeline stage 606 to produce a "shared" response 805 on shared response line 509 (FIG. 5) in clock cycle fifteen.

Although FIGS. 7 and 8 above are used to describe a situation in which the contingent response comprises a "shared" response, those skilled in the art will appreciate that the same principles apply where the contingent response is a "modified" response. In the case of the contingent modified response, the pending operation type would be a store-type operation and the snooped operation would be either a store-type operation or a load-type operation. Furthermore, those skilled in the art will appreciate that the contingent response unit according to the invention may be implemented to support any number of other responses used in a particular cache coherency protocol.

The above described preferred embodiments are intended to illustrate the principles of the invention, but not to limit the scope of the invention. Various other embodiments and modifications to these preferred embodiments may be made by those skilled in the art without departing from the scope of the following claims. For example, although the contingent response unit is illustrated in connection with a data processing system having three processors, the unit may be used in systems having any number of processors. Also, those skilled in the art will appreciate that any number of logic arrangements may be used to set or clear the contingent response flags according to the invention. The logic illustrated in the figures comprises simply the preferred logic arrangements.

What is claimed is:

1. A contingent response arrangement for a first processor which shares a pipelined address bus with at least one other processor, the contingent response arrangement comprising:
   (a) a pending operation unit for identifying a matched operation, the matched operation comprising a first processor operation which is pending on the pipelined address bus and which specifies an address which matches a snoop address;
   (b) a snoop pipeline having a plurality of pipeline stages, each pipeline stage including a contingent response flag location and an identifier location, each contingent response flag location for storing a contingent response flag and each identifier location for storing an identifier associated with a particular matched operation; and
   (c) a contingent response flag control arrangement associated with the snoop pipeline, the contingent response flag control arrangement (i) for setting the response flag in one snoop pipeline stage in response to the matched operation identified by the pending operation unit and (ii) for clearing the response flag of any critical snoop pipeline stage which contains an identifier which matches an identifier for an unsuccessful finishing operation from the first processor.

2. The apparatus of claim 1 wherein the pending operation unit includes:
   (a) a pending operation queue having a plurality of pending operation queue locations, each pending operation queue location for storing an address for a first processor operation pending on the pipelined address bus.

3. The apparatus of claim 2 wherein the pending operation unit further includes:
   (a) a pending operation queue comparator arrangement (i) for receiving the snoop address from another processor sharing the pipelined address bus and (ii) for comparing the received snoop address with the address stored in each pending operation queue location.

4. The apparatus of claim 1 further comprising:
   (a) an encoder connected between the pending operation unit and the snoop pipeline (i) for producing the identifier associated with the matched operation and (ii) for causing the identifier to be stored in the identifier location associated with a first snoop pipeline stage.

5. The apparatus of claim 1 wherein the contingent response flag control arrangement includes:
   (a) flag clearing logic associated with each critical snoop pipeline stage, the flag clearing logic for clearing the contingent response flag from the respective critical snoop pipeline stage upon receipt of an identifier from the respective critical snoop pipeline stage which matches an identifier for the unsuccessful finishing operation.

6. The apparatus of claim 5 wherein the flag clearing logic associated with each critical snoop pipeline stage includes:
   (a) a flag control comparator for receiving the identifier of the unsuccessful finishing operation and comparing that identifier with the identifier stored in the respective critical snoop pipeline stage.

7. The apparatus of claim 6 wherein the flag clearing logic associated with each critical snoop pipeline stage includes:
   (a) a flag control AND gate having a first input connected to receive the contents of the contingent response flag location of the respective critical snoop pipeline stage, having a second input adapted to receive the inverted output of the flag control comparator associated with the particular critical snoop pipeline stage, and further having an output connected to the contingent response flag location of a next succeeding snoop pipeline stage.

8. The apparatus of claim 1 wherein:
   (a) each snoop pipeline stage includes a first contingent response flag location and a second contingent response flag location; and
   (b) the pending operation unit is also for identifying an operation type associated with the matched operation and a snoop type associated with the snoop address.

9. The apparatus of claim 8 wherein the pending operation unit (i) produces a contingent shared output when the matched operation type comprises a load-type operation and the snoop type comprises a load-type operation, and (ii) produces a contingent modified output when the matched operation type comprises a store-type operation.

10. The apparatus of claim 9 wherein the contingent response flag control arrangement sets the first contingent response flag location of the first pipeline stage in response to the contingent shared output and sets the second contingent response flag in the first pipeline stage in response to the contingent modified output.

11. A contingent response arrangement for a first processor which shares a pipelined address bus with at least one other processor, the contingent response arrangement comprising:

(a) a pending operation queue having a plurality of pending operation queue locations, each pending operation queue location for storing an address for a first processor operation pending on the pipelined address bus;

(b) a pending operation queue comparator arrangement (i) for receiving a snoop address from another processor sharing the pipelined address bus, and (ii) for comparing the received snoop address with the address stored in each pending operation queue location to identify a matched operation, the matched operation comprising a first processor operation which is pending on the pipelined address bus and which specifies an address which matches the snoop address;

(c) a snoop pipeline having a plurality of pipeline stages, each pipeline stage including at least one contingent response flag location and an identifier location, each contingent response flag location included in a pipeline stage for storing a contingent response flag and the identifier location of each pipeline stage for storing an identifier associated with a particular matched operation; and (d) a contingent response flag control arrangement associated with the snoop pipeline, the contingent response flag control arrangement (i) for setting a contingent response flag at one of the contingent response locations in a first snoop pipeline stage in response to the matched operation identified by the pending operation comparator arrangement, and (ii) for clearing the response flag of any critical snoop pipeline stage which contains an identifier which matches an identifier for an unsuccessful finishing operation from the first processor.

12. The apparatus of claim 11 further comprising:

(a) an encoder connected between the pending operation comparator arrangement and the snoop pipeline (i) for producing the identifier associated with the matched operation and (ii) for causing the identifier to be stored in the identifier location associated with the first snoop pipeline stage.

13. The apparatus of claim 11 wherein:

(a) each snoop pipeline stage includes a first contingent response flag location and a second contingent response flag location; and (b) the pending operation comparator arrangement includes an operation type identifier arrangement for identifying an operation type associated with the matched operation and a snoop type associated with the snoop address.

14. The apparatus of claim 13 wherein the operation type identifier arrangement (i) produces a contingent shared output when the matched operation type comprises a load-type operation and the snoop type comprises a load-type operation, and (ii) produces a contingent modified output when the matched operation type comprises a store-type operation.

15. The apparatus of claim 14 wherein the contingent response flag control arrangement sets the first contingent response flag location of the first pipeline stage in response to the contingent shared output and sets the second contingent response flag in the first pipeline stage in response to the contingent modified output.

16. A method for providing a contingent response from a first processor which shares a pipelined address bus with at least one other processor, the method comprising the steps of:

(a) identifying a matched operation, the matched operation comprising a first processor operation which is pending on the pipelined address bus and which specifies an address which matches a snoop address;

(b) storing a contingent response flag and an operation identifier in a contingent response storage arrangement in response to the matched operation, the operation identifier identifying the matched operation;

(c) where the operation identifier is matched by an identifier for an unsuccessful finishing operation during a critical period, clearing the contingent response flag associated with the matched identifier; and (d) where the operation identifier is not matched by the identifier for an unsuccessful finishing operation during a critical period, using the contingent response flag to signal a response to a bus operation associated with the snoop address.

17. The method of claim 16 wherein the step of identifying the matched operation includes:

(a) storing an address for a first processor operation pending on the pipelined address bus.

18. The method of claim 17 wherein the step of identifying the matched operation further includes:

(a) receiving the snoop address from another processor sharing the pipelined address bus and comparing the received snoop address with the stored address.

19. The method of claim 16 wherein the identifier comprises an index value and further comprising the step of:

(a) producing the index value with an encoder.

20. The method of claim 16 wherein the step of clearing the contingent response flag associated with the matched identifier comprises the steps of:

(a) comparing an identifier associated with the unsuccessful finishing operation with the identifier stored in response to the matched operation; and (b) ANDing the contingent response flag with the inverted result of the comparison between the identifier associated with the unsuccessful finishing operation and the identifier stored in response to the matched operation.

21. The method of claim 16 further comprising the steps of:

(a) identifying an operation type associated with the matched operation; and (b) identifying a snoop type associated with the snoop address.

22. The method of claim 21 further comprising the steps of:

(a) producing a contingent shared output when the matched operation type comprises a load-type operation and the snoop type comprises a load-type operation; and (b) producing a contingent modified output when the matched operation type comprises a store-type operation.

23. The method of claim 22 further comprising the steps of:
  (a) setting a first contingent response flag in response to the contingent shared output; and
  (b) setting a second contingent response flag in response to the contingent modified output.

24. A data processing system comprising:
  (a) a plurality of processors which each share a pipelined address bus;
  (b) a plurality of pending operation units, each different pending operation unit associated with a different one of the processors for identifying a matched operation from the respective processor, the matched operation comprising an operation from the respective processor which is pending on the pipelined address bus and which specifies an address which matches a snoop address;
  (c) a plurality of snoop pipelines, each different snoop pipeline being associated with a different one of the processors and having a plurality of pipeline stages, each pipeline stage including a contingent response flag location and an identifier location, each contingent response flag location for storing a contingent response flag and each identifier location for storing an identifier associated with a particular matched operation; and
  (d) a different contingent response flag control arrangement associated with each different snoop pipeline, the respective contingent response flag control arrangement (i) for setting the response flag in one snoop pipeline stage of the respective snoop pipeline in response to the matched operation identified by the pending operation unit and (ii) for clearing the response flag of any critical snoop pipeline stage of the respective snoop pipeline which contains an identifier which matches an identifier for an unsuccessful finishing operation from the respective processor.

25. The apparatus of claim 24 wherein each contingent response flag control arrangement includes:
  (a) flag clearing logic associated with each critical snoop pipeline stage of the respective snoop pipeline, the flag clearing logic for clearing the contingent response flag from the respective critical snoop pipeline stage upon receipt of an identifier from the respective critical snoop pipeline stage which matches an identifier for the unsuccessful finishing operation.

26. The apparatus of claim 25 wherein the flag clearing logic associated with each critical snoop pipeline stage includes:
  (a) a flag control comparator for receiving the identifier of the unsuccessful finishing operation and comparing that identifier with the identifier stored in the respective critical snoop pipeline stage.

27. The apparatus of claim 26 wherein the flag clearing logic associated with each critical snoop pipeline stage includes:
  (a) a flag control AND gate having a first input connected to receive the contents of the contingent response flag location of the respective critical snoop pipeline stage, having a second input adapted to receive the inverted output of the flag control comparator associated with the particular critical snoop pipeline stage, and having an output connected to the contingent response flag location of a next succeeding snoop pipeline stage.

28. The apparatus of claim 24 wherein:
  (a) each snoop pipeline stage includes a first contingent response flag location and a second contingent response flag location; and
  (b) the respective pending operation unit is also for identifying an operation type associated with the matched operation and a snoop type associated with the snoop address.

29. The apparatus of claim 28 wherein the respective pending operation unit (i) produces a contingent shared output when the matched operation type comprises a load-type operation and the snoop type comprises a load-type operation, and (ii) produces a contingent modified output when the matched operation type comprises a store-type operation.

30. The apparatus of claim 29 wherein the respective contingent response flag control arrangement sets the first contingent response flag location of the respective first pipeline stage in response to the contingent shared output and sets the second contingent response flag in the respective first pipeline stage in response to the contingent modified output.

* * * * *